United States Patent [19]

Honda et al.

[11] 4,300,970

[45] Nov. 17, 1981

[54] METHOD OF BONDING VULCANIZED RUBBER TO RESIN

[75] Inventors: Toshio Honda, Akigawa; Masao Ogawa, Kawagoe; Yukio Fukuura, Kodaira; Hikaru Ishikawa, Kokubunji; Kazuo Naito, Kodaira; Setsuo Akiyama, Higashimurayama; Itsuo Tanuma, Tokorozawa, all of Japan

[73] Assignee: Bridgestone Tire Company Limited, Tokyo, Japan

[21] Appl. No.: 149,596

[22] Filed: May 13, 1980

[30] Foreign Application Priority Data

May 16, 1979 [JP] Japan .................................. 54-60712
Aug. 7, 1979 [JP] Japan .................................. 54-99846

[51] Int. Cl.³ ............................................. B29D 7/08
[52] U.S. Cl. ............................. 156/244.11; 156/244.23; 156/245; 156/333; 156/338; 264/328.1; 428/492; 428/494; 428/495
[58] Field of Search ................ 156/244.11, 244.23, 156/333, 338, 242, 245; 264/328; 428/492, 494, 495

[56] References Cited

U.S. PATENT DOCUMENTS

| | | | |
|---|---|---|---|
| 3,515,616 | 6/1970 | Miyamoto et al. | 158/333 |
| 3,657,046 | 4/1972 | Furukawa et al. | 428/492 |
| 3,725,177 | 4/1973 | Vecellio et al. | 156/338 |
| 3,861,980 | 1/1975 | Wise | 156/338 |
| 3,940,548 | 2/1976 | Todani et al. | 428/492 |
| 3,962,011 | 6/1976 | Gils | 156/333 |
| 3,968,316 | 7/1976 | Jyo et al. | 428/492 |

*Primary Examiner*—Caleb Weston
*Attorney, Agent, or Firm*—Sughrue, Mion, Zinn, Macpeak & Seas

[57] ABSTRACT

A composite composed of vulcanized rubber and thermoplastic resin which adheres tightly to the rubber can be obtained by treating the surface of the vulcanized rubber with at least one of halogen, halogen generating compound and halogenoid, and bonding melted polyamide resin, polyester resin, styrene series resin or acrylic resin to the above treated rubber surface region by the injection or extrusion molding.

10 Claims, 4 Drawing Figures

FIG_1a
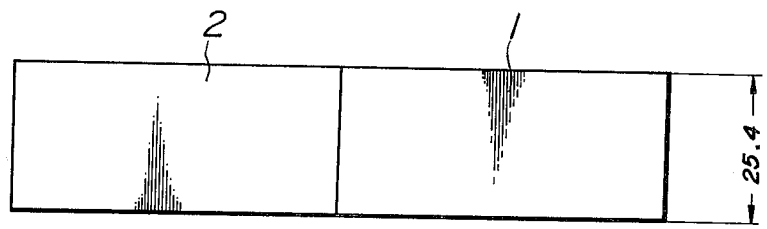
FIG_1b
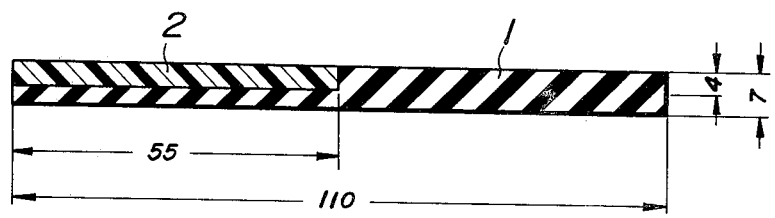
FIG_2a
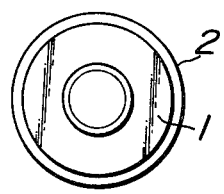
FIG_2b
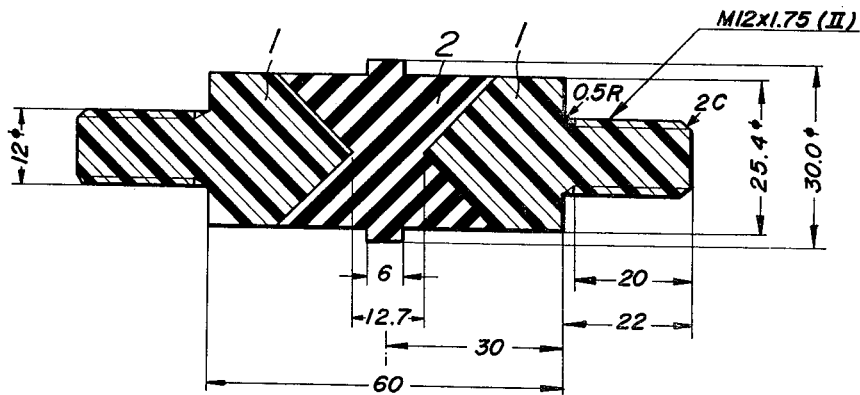

METHOD OF BONDING VULCANIZED RUBBER TO RESIN

BACKGROUND OF THE INVENTION

1. Field of the Invention

The present invention relates to a method of bonding vulcanized rubber to resin. 2. Description of the Prior Art Among recently developed various thermoplastic resins, resins called as engineering plastics are known. These resins are polyamide resin, polyester resin, polycarbonate resin, polyacetal resin, polysulfone resin, silicone resin, polyphenylene oxide resin, polyimide resin, ABS resin, methacrylic resin and the like, and many of them are excellent in mechanical strength, heat resistance, creep resistance, chemical resistance, electrical property, dimensional stability and the like, and can be widely used in place of metals, such as iron, zinc, aluminum and the like, under various use conditions.

In general, industrial rubber products are composites composed of rubber and metal; rubber and plastics; and rubber and inorganic substance, but major part of the rubber products are composites composed of rubber and metal. However, in recent industrial rubber products, the rubber-metal composite tends to be replaced by a rubber-resin composite. Industrial rubber composites are now required to have a light weight, excellent corrosion resistance, chemical resistance, wear resistance and electrical property, and a low friction coefficient.

When the composites of rubber and plastics are produced, the rubber must be tightly bonded to the plastics. In the conventional method for bonding rubber to plastics, a chlorine-containing adhesive is applied on the surface of a resin molded article obtained by the extrusion molding and the resin molded article is bonded to an unvulcanized rubber through the adhesive layer by vulcanization. However, this method of bonding resin molded article to rubber through vulcanization has the following drawbacks. That is, the adhesion strength between the resin molded article and the rubber lowers or the resin molded article cracks due to the repeating cooling and heating cycles or to the heat aging during the vulcanization step, and further the adhesion strength varies depending upon the kind of the resin. Moreover, when thermoplastic resins having a low melting point are used among thermoplastic resins, the resin molded article deforms due to the high temperature and pressure during the vulcanization.

SUMMARY OF THE INVENTION

In order to obviate the above described drawbacks, the inventors have made various investigations with respect to treating agents for the surface of a vulcanized rubber in a method of bonding a vulcanized rubber to a resin. The surface of the vulcanized rubber is treated with a treating agent to form a treated rubber surface region, and a previously melted polyamide resin, polyester resin, styrene series resin or acrylic resin is bonded to the above treated rubber surface region through an injection molding or extrusion molding. The inventors found a method of bonding tightly the vulcanized rubber to the resin to produce rubber products having a high dimensional accuracy, and accomplished the present invention.

That is, the feature of the present invention is a method of bonding vulcanized rubber to resin, comprising treating the surface of a vulcanized rubber with at least one member selected from the group consisting of halogen, halogen generating compound and halogenoid to form a treated rubber surface region, and bonding a heated and melted resin selected from the group consisting of polyamide resin, polyester resin, styrene series resin and acrylic resin to the above treated rubber surface region by the injection or extrusion molding.

According to the present invention, a vulcanized rubber having an optional shape is previously prepared, the rubber is treated with at least one of halogen, halogen generating compound and halogenoid at the surface to be bonded to a resin, the thus treated vulcanized rubber is placed in a metal mold, and the above described specifically limited resin previously heated and melted is bonded to the above treated rubber surface region by injection or extrusion molding to produce a composite composed of the rubber and the resin bonded tightly thereto at the interface. Moreover, in the present invention, vulcanized rubber is treated with a solution or the like at the surface to be bonded to resin without subjecting the surface to mechanical treatment, such as buffing by means of emery paper, grinder and the like, and therefore composites having a precise and complicated shape can be produced.

BRIEF DESCRIPTION OF THE DRAWINGS

FIGS. 1a and 1b are a plan view and a sectional view respectively of a test piece used for evaluating the bonding method of the present invention; and FIGS. 2a and 2b are a side view and a sectional view respectively of another test piece used for evaluating the bonding method of the present invention.

DESCRIPTION OF THE PREFERRED EMBODIMENT

The present invention will be explained in more detail.

As the rubber component of the vulcanized rubbers to be used in the present invention, there can be used natural rubber (NR) and synthetic rubber having carbon-carbon double bonds in the structural formula alone or in admixture of at least two of the rubbers. The synthetic rubbers include polyisoprene rubber (IR), polybutadiene rubber (BR), polychloroprene rubber and the like, which are homopolymers of conjugated diene compounds, such as isoprene, butadiene, chloroprene and the like; styrene-butadiene copolymer rubber (SBR), vinylpyridine-butadiene-styrene copolymer rubber, acrylonitrile-butadiene copolymer rubber, acrylic acid-butadiene copolymer rubber, methacrylic acid-butadiene copolymer rubber, methyl acrylate-butadiene copolymer rubber, methyl methacrylate-butadiene copolymer rubber and the like, which are copolymers of the above described conjufated diene compounds with vinyl compounds, such as styrene, acrylonitrile, vinylpyridiene, acrylic acid, methacrylic acid, alkyl arcylates, alkyl methacrylates and the like; copolymers of olefins, such as ethylene, propylene, isobutylene and the like, with diene compounds, for example, isobutylene-isoprene copolymer rubber (IIR); copolymers (EPDM) of olefins with nonconjugated diene, for example, ethylene-propylene-cyclopentadiene terpolymer, ethylene-propylene-5-ethyldiene-2-norbornane terpolymer, ethylene-propylene-1,4-hexadiene terpolymer; polyalkenamer obtained by the ring opening polymerization of cycloolefin, for example, polypentanamer; rubber obtained by the ring opening polymerization of oxirane ring, for example, sulfur-vulcanizable polyepichlorohydrin rubber and polypropylene oxide rubber; and the like. The rubber components of the vulcanized rubber of the present invention further include halogenides of the above described rubbers, for example, chlorinated isobutylene-isoprene copolymer rubber (Cl-IIR), brominated isobutylene-isoprene copolymer rubber (Br-IIR), polynorbornane rubber and the like.

The vulcanized rubber to be used in the present invention is obtained in the following manner. The above described rubber is fully kneaded together with fillers, such as carbon black, silica, calcium carbonate, calcium sulfate, clay, diatomaceous earth, mica and the like; softeners, such as mineral oil, vegetable oil, synthetic plasticizer and the like; vulcanization accelerators, such as stearic acid and the like; antioxidant, crosslinking agent and promoter and the like in a kneader, and the resulting homogeneous mixture is vulcanized under a proper vulcanization condition.

The vulcanized rubbers to be used in the present invention include not only vulcanized rubbers obtained by the commonly known and most important sulfur vulcanization, but also all vulcanized rubbers obtained by the thiurum vulcanization, peroxide vulcanization, quinoide vulcanization, resin vulcanization, metal salt vulcanization, metal oxide vulcanization, polyamine vulcanization, radiation vulcanization, hexamethylenetetramine vulcanization and the like.

The halogens to be used in the treatment of the vulcanized rubber surface include chlorine, bromine and iodine. These halogens are used in the form of molecule and an aqueous solution thereof. The halogen generating compounds include hypochlorous acid and hypobromous acid, and are used as such or in the form of an aqueous solution thereof.

The halogenoids include halogenated isocyanate, N-monohaloalkylurethane, N,N-dihaloalkylurethane, N,N-dihaloarylsulfonamide, sulfur halide, sulfenyl halide, halomethyl ether, thiocyanogen, iodine azide, bromine azide, iodine chloride, iodine bromide, trichloroacetic acid iodide, acetic acid bromide, iodine nitrate, alkyl hypohalite, alkyl thionylchloride, aryl thionylchloride, nitrosyl chloride, nitrosyl bromide, halogenated isocyanuric acid, halogenated methylhydantoin and the like.

Among the above described treating agents, the use of halogenoids, particularly the use of halogenated isocyanate, N,N-dihaloalkylurethane, N,N-dihaloarylsulfonamide, alkyl hypohalite, halogenated isocyanuric acid, halogenated methylhydantoin and the like is suitable for attaining the object of the present invention in view of the performance, treating processability and safety treatment.

The halogenoids are concretely iodine isocyanate, N,N-dichloroethylurethane, N,N-dibromoethylurethane, N,N-dichloropropylurethane, N,N-dibromopropylurethane, N,N-dichlorodibenzylurethane, N,N-dibromobenzylurethane, N,N-dichloro-p-toluenesulfonamide, N,N-dibromotoluenesulfonamide, N,N-dichlorobenzenesulfonamide, N,N-dibromobenzenesulfonamide, tertiary-butyl hypohalite, trichloroisocyanuric acid, dichloroisocyanuric acid, dibromo-dimethylhydantoin, dichloro-dimethylhydantoin, dichloromethyl-isobutylhydantoin, dichloro-methylhexylhydantoin and the like.

When the vulcanized rubber surface is treated with the halogenoid in the present invention, the halogenoid is dissolved in a proper solvent and used in a concentration of 0.1–20% by weight, preferably, 1–15% by weight. As the solvent, mention may be made of halogenated hydrocarbons, such as carbon tetrachloride, chloroform, dichloromethane and the like; aromatic hydrocarbons, such as benzene, nitrobenzene, halogenated benzene, toluene, xylene and the like; chain or cyclic ethers, such as dimethyl ether, diethyl ether, tetrahydrofuran (THF), dioxane and the like; esters, such as ethyl acetate and the like; aliphatic hydroxarbons, such as pentane, hexane, heptane, octane, cyclohexane and the like; ketones, such as acetone, cyclohexanone, methyl ethyl ketone and the like; alcohols, such as tertiary butyl alcohol and the like. Among them, tetrahydrofuran, dioxane, acetone, benzene, toluene, carbon tetrachloride, chloroform, methyl ethyl ketone and ethyl acetate are preferably used.

As a method of forming a treated rubber surface region by treating a rubber surface with the above described treating agent, any industrial technique capable of making the rubber surface in contact with the treating agent can be adopted. This includes brushing, spraying, dipping and the like.

The resin to be bonded to the vulcanized rubber in the present invention is selected from polyamide resin, polyester resin, styrene series resin and acrylic resin.

As the polyamide resin, there can be used nylon-6, nylon-11, nylon-12, nylon-66, nylon-610 and their copolymers and blends, and their modified polymers obtained by modifying a part of the functional groups of the polyamides.

As the polyester resin, there can advantageously be used polyethylene terephthalate, polybutylene terephthalate and their copolymers and blends, and their modified polymers obtained by modifying a part of the functional groups of the polyesters. Of course, other polyester resins can be used as well.

As the styrene series resin, there can be used polystyrene resin, styrene copolymer resins, such as ethylene propylene nonconjugated diene-styrene-acrylonitrile copolymer resin (EPSAN resin), acrylonitrile-acrylic-styrene copolymer resin (AAS resin), acrylonitrile-styrene copolymer resin (AS resin), acrylonitrile-butadiene-styrene copolymer resin (ABS resin), butadiene-methyl methacrylate copolymer resin (MBS resin) and the like, and blends thereof, and their modified polymers obtained by modifying a part of the functional groups or carbon-carbon double bonds of the polystyrene or styrene copolymers.

As the acrylic resin, there can be used polyacrylic acid resin, polymethacrylic acid resin, polyacrylamide resin, polyacrylonitrile resin, and their copolymers and blends, and their modified polymers obtained by modifying a part of the functional groups of the acrylic polymers.

The above described resins can be mixed with inorganic fillers, such as glass fibers, calcium carbonate, talc and the like, coloring agent, ultraviolet ray absorber and the like, which are commonly added to plastics.

Further, the above described resins can be mixed with other thermoplastic resins in order to improve the processability and adhesion of the resins.

The above described resins are bonded to the treated surface region of a vulcanized rubber in the following manner. A previously melted resin is injected or extruded on the treated rubber surface region, and the resulting assembly is cooled to cure the resins.

The following examples are given for the purpose of illustration of this invention and are not intended as limitations thereof.

EXAMPLE 1

A rubber composition having a compounding recipe shown in the following Table 1 was vulcanized under a condition shown in Table 1 to produce a vulcanized rubber. From the vulcanized rubber were cut out rubber pieces 2 for test pieces shown in FIGS. 1a and 1b, which would be used for the 90° peeling test described in ASTM D429, Method B, and conical rubber pieces 2 for test pieces shown in FIGS. 2a and 2b, which would be used for the tensile test described in ASTM D429, Method C. In FIGS. 1a, 1b and 2a, 2b, the numeral 1 represents resin and the unit of the dimension of the test pieces is mm.

As rubber surface treating solutions, acetone solutions containing 2, 5, 10 or 20% by weight of each halogenoid of DCTS (N,N-dichloro-p-toluenesulfonamide) and TCCA (trichloroisocyanuric acid) were prepared, and each of the acetone solutions was applied by means of a brush to the vulcanized rubber pieces 2 shown in FIGS. 1a, 1b, or FIGS. 2a, 2b at the surface to be adhered to a resin.

As polyamide resins, nylon-6 (CM 1001 made by Toray Co.), nylon-66 (CM 3001N made by Toray Co.) and nylon-12 (Daiamid made by Daicel Co.) were used, and each of the polyamides was dried for 8 hours under a condition of 120° C. and 5 mmHg.

Then, the above treated vulcanized rubber piece is placed in a metal mold, and each of the above described polyamide resins was bonded to the treated surface of the rubber piece through an injection molding by means of an injection molding machine under an injection condition of 230° C. in the case of nylon-6, 250° C. in the case of nylon-66 or 180° C. in the case of nylon-12 to produce a test piece of a composite composed of the rubber and the resin as shown in FIGS. 1a, 1b, or 2a, 2b. In FIGS. 1 and 2, the numeral 1 represents the resin, and the numeral 2 represents the rubber.

Then, the test piece shown in FIGS. 1a, 1b or 2a, 2b was subjected to an adhesion test according to Method B or Method C in ASTM D429, respectively. The obtained results are shown in the following Table 2. It can be seen from Table 2 that nontreated vulcanized rubber does not adhere to polyamide resin, but vulcanized rubber treated according to the method of the present invention adheres tightly to polyamide resin.

TABLE 1

|  | (parts by weight) |
|---|---|
| Natural rubber | 70 |
| SBR 1500 | 30 |
| Carbon black | 50 |
| Aromatic process oil | 5 |
| Stearic acid | 1.5 |
| Antioxidant *1 | 1 |
| Paraffin wax | 1 |
| Zinc white | 5 |
| Sulfur | 2 |
| Vulcanization accelerator *2 | 1 |
| Vulcanization condition: 160° C. × 20 minutes | |

*1 N-phenyl-N'-isopropyl-p-phenylenediamine
*2 Dibenzothiazyl sulfide

TABLE 2

| | Poly-amide resin | Halogenoid | | | | | | | | Not treated (Comparative example) |
|---|---|---|---|---|---|---|---|---|---|---|
| | | DCTS (N,N-Dichloro-p-toluenesulfonamide) | | | | TCCA (Trichloroisocyanuric acid) | | | | |
| | | 2% | 5% | 10% | 20% | 2% | 5% | 10% | 20% | |
| ASTM D429, Method B | Nylon-6 (Toray, CM 1001) | 5kg/25mm (25R) | 20kg/25mm (80R) | 30kg/25mm (100R) | 40kg/25mm (100R) | 21kg/25mm (80R) | 37kg/25mm (100R) | 45kg/25mm (100R) | 42kg/25mm (100R) | 0kg/25mm (R/P) |
| | Nylon-66 (Toray, CM 3001N) | 4kg/25mm (25R) | 12kg/25mm (50R) | 20kg/25mm (70R) | 29kg/25mm (85R) | 8kg/25mm (40R) | 35kg/25mm (100R) | 40kg/25mm (100R) | 29kg/25mm (100R) | 0kg/25mm (R/P) |
| | Nylon-12 (Daicel, Daiamid) | 5kg/25mm (20R) | 10kg/25mm (40R) | 25kg/25mm (80R) | 30kg/25mm (60R) | 15kg/25mm (60R) | 30kg/25mm (100R) | 50kg/25mm (100R) | 50kg/25mm (100R) | 1kg/25mm (R/P) |
| ASTM D429, Method C | Nylon-6 (Toray, CM 1001) | 52kg (80R) | 76kg (95R) | 86kg (100R) | 90kg (100R) | 87kg (100R) | 92kg (100R) | 90kg (100R) | 90kg (100R) | 0kg (R/P) |
| | Nylon-66 (Toray, CM 3001N) | 78kg (100R) | 70kg (100R) | 86kg (100R) | 92kg (100R) | 92kg (100R) | 62kg (80R) | 86kg (100R) | 89kg (100R) | 0kg (R/P) |
| | Nylon-12 (Daicel, Daiamid) | 58kg (80R) | 94kg (100R) | 96kg (100R) | 99kg (100R) | 87kg (100R) | 78kg (100R) | 78kg (100R) | 70kg (100R) | 0kg (R/P) |

Note:
R: Cohesion of rubber is broken (numerical value is % of broken area of rubber).
R/P: Rubber is peeled from plastics at the interface.

EXAMPLE 2

Adhesion of polyester resin was evaluated in the same procedure as described in Example 1.

As polyester resins, polyethylene terephthalate (FR-PET, B-3030 made by Teijin Co.), polybutylene terephthalate (Tufpet N 1000 made by Mitsubishi Rayon Co.), Hitrel 7246 made by DuPont Co. and Pelprene 150B made by Toyobo Co. were used. The polyester resins were dried for 8 hours under a condition of 120° C. and 5 mmHg.

Then, test pieces were produced by means of an injection molding machine under an injection condition of 265° C. in the case of FR-PET, 260° C. in the case of Tufpet N 1000, 250° C. in the case of Hitrel 7246, and 240° C. in the case of Pelprene 150B.

The obtained results are shown in the following Table 3.

TABLE 3(a)

| | Poly-ester resin | Halogenoid | | | | | | | | Not treated (Comparative example) |
|---|---|---|---|---|---|---|---|---|---|---|
| | | DCTS (N,N-Dichloro-p-toluenesulfonamide) | | | | TCCA (Trichloroisocyanuric acid) | | | | |
| | | 2% | 5% | 10% | 20% | 2% | 5% | 10% | 20% | |
| ASTM D429, Method B | PET (FR-PET) | 12kg/25mm (50R) | —kg/25mm (—) | 36kg/25mm (100R) | 38kg/25mm (100R) | 28kg/25mm (70R) | —kg/25mm (—) | 40kg/25mm (100R) | 39kg/25mm (100R) | 0kg/25mm (R/P) |
| | PBT (Tufpet N1000) | 38kg/25mm (90R) | 42kg/25mm (100R) | 48kg/25mm (100R) | 45kg/25mm (100R) | 40kg/25mm (100R) | 42kg/25mm (100R) | 41kg/25mm (100R) | 32kg/25mm (100R) | 0kg/25mm (R/P) |
| | Copolymer (Hitrel 7246) | 39kg/25mm (90R) | 50kg/25mm (100R) | 46kg/25mm (100R) | 43kg/25mm (100R) | 51kg/25mm (100R) | 42kg/25mm (100R) | 35kg/25mm (100R) | 28kg/25mm (100R) | 1kg/25mm (R/P) |
| | Copolymer (Pelprene 150B) | 25kg/25mm (70R) | 21kg/25mm (60R) | 45kg/25mm (100R) | 40kg/25mm (100R) | 48kg/25mm (100R) | 48kg/25mm (100R) | 44kg/25mm (100R) | 36kg/25mm (100R) | 0kg/25mm (R/P) |

TABLE 3(b)

| | Poly-ester resin | Halogenoid | | | | | | | | Not treated (Comparative example) |
|---|---|---|---|---|---|---|---|---|---|---|
| | | DCTS (N,N-Dichloro-p-toluenesulfonamide) | | | | TCCA (Trichloroisocyanuric acid) | | | | |
| | | 2% | 5% | 10% | 20% | 2% | 5% | 10% | 20% | |
| ASTM D429, Method C | PET (FR-PET) | 98kg (80R) | 120kg (100R) | 109kg (95R) | 120kg (100R) | 105kg (90R) | 129kg (100R) | 120kg (100R) | 126kg (100R) | 0kg (R/P) |
| | PBT (Tufpet N1000) | 112kg (90R) | 128kg (100R) | 129kg (100R) | 129kg (100R) | 129kg (100R) | 108kg (100R) | 110kg (100R) | 105kg (100R) | 0kg (R/P) |
| | Copolymer (Hitrel 7246) | 108kg (95R) | 126kg (100R) | 120kg (100R) | 115kg (100R) | 130kg (100R) | 108kg (100R) | 102kg (100R) | 101kg (100R) | 0kg (R/P) |
| | Copolymer (Pelprene 150B) | 128kg (100R) | 131kg (100R) | 105kg (100R) | 103kg (100R) | 126kg (100R) | 108kg (100R) | 106kg (100R) | 100kg (100R) | 0kg (R/P) |

EXAMPLE 3

Adhesion of another polyester resin (polyarylate resin, AX 1500 produced by Unichika Co. and called as U polymer) was evaluated in the same procedure as described in Example 1. The injection molding was carried out at a temperature of 230° C.

The obtained results are shown in the following Table 4.

The kind of used styrene series resins and the injection molding condition are as follows. Polystyrene resin (Styron 683 made by Asahi Dow Co.) was injection molded at 260° C., acrylonitrile-butadiene-styrene copolymer resin (Cevian SER 20 made by Daicel Co.) was injection molded at 200° C., and glass fiber-reinforced acrylonitrile-styrene copolymer resin (Cevian N 080 FS made by Daicel Co.) was injection molded at 235° C.

The obtained results are shown in the following Table 5.

TABLE 4

| Method | Halogenoid | | | | | | | | Not treated (Comparative example) |
|---|---|---|---|---|---|---|---|---|---|
| | DCTS (N,N-Dichloro-p-toluenesulfonamide) | | | | TCCA (Trichloroisocyanuric acid) | | | | |
| | 2% | 5% | 10% | 20% | 2% | 5% | 10% | 20% | |
| ASTM D429, Method B | 15kg/25mm (R/P) | 18kg/25mm (20R) | 50kg/25mm (100R) | 48kg/25mm (100R) | 10kg/25mm (20R) | 46kg/25mm (90R) | 52kg/25mm (P) | 49kg/25mm (100R) | 0kg/25mm (R/P) |
| ASTM D429, Method C | 26kg (R/P) | 69kg (50R) | 112kg (100R) | 108kg (100R) | 48kg (40R) | 102kg (90R) | 121kg (100R) | 105kg (100R) | 0kg (R/P) |

Note:
P: Cohesion of plastics is broken.

EXAMPLE 4

Adhesion of styrene series resins was evaluated in the same procedure as described in Example 1.

TABLE 5

| | Styrene | Halogenoid | | | | | | | | Not treated (Comparative example) |
|---|---|---|---|---|---|---|---|---|---|---|
| | | DCTS (N,N-Dichloro-p-toluenesulfonamide) | | | | TCAA (Trichloroisocyanuric acid) | | | | |
| | | 2% | 5% | 10% | 20% | 2% | 5% | 10% | 20% | |
| ASTM D429, Method B | Polystyrene resin (Styron 683) | 0kg/25mm (R/P) | 1kg/25mm (R/P) | 4kg/25mm (5R) | 5kg/25mm (10R) | 1kg/25mm (R/P) | 2kg/25mm (R/P) | 5kg/25mm (10R) | 6kg/25mm (10R) | 0kg/25mm (R/P) |
| | ABS resin (Cevian | 5kg/25mm | 32kg/25mm | 45kg/25mm | 40kg/25mm | 40kg/25mm | 45kg/25mm | 36kg/25mm | 40kg/25mm | 0kg/25mm |

TABLE 5-continued

| | | Halogenoid | | | | | | | | Not treated (Comparative example) |
|---|---|---|---|---|---|---|---|---|---|---|
| | | DCTS (N,N-Dichloro-p-toluenesulfonamide) | | | | TCAA (Trichloroisocyanuric acid) | | | | |
| | Styrene | 2% | 5% | 10% | 20% | 2% | 5% | 10% | 20% | |
| ASTM D429, Method C | SER20) FR-AS resin (Cevian N 080FS) | (10R) 30kg/25mm | (90R) 42kg/25mm | (100R) 48kg/25mm | (100R) 42kg/25mm | (100R) 45kg/25mm | (100R) 43kg/25mm | (100R) 38kg/25mm | (100R) 39kg/25mm | (R/P) 0kg/25mm |
| | | (85R) | (100R) | (100R) 25kg | (100R) | (100R) | (100R) | (100R) 50kg | (100R) | (R/P) 2kg |
| | Polystyrene resin (Styron 683) | | | (20R) | | | | (30R) | | (R/P) |
| | ABS resin (Cevian SER20) | 102kg | 128kg | 138kg | 140kg | 139kg | 124kg | 110kg | 108kg | 5kg |
| | | (90R) | (100R) | (100R) | (100R) | (100R) | (100R) | (100R) | (100R) | (R/P) |
| | FR-AS resin (Cevian N 080FS) | 124kg | 129kg | 136kg | 130kg | 139kg | 120kg | 111kg | 106kg | 1kg |
| | | (100R) | (100R) | (100R) | (100R) | (100R) | (100R) | (100R) | (100R) | (R/P) |

EXAMPLE 5

Adhesion of acrylic resins was evaluated in the same procedure as described in Example 1.

The kind of used acrylic resins and the injection molding condition are as follows. Methacrylic resin (Acrypet MD made by Mitsubishi Rayon Co.) was injection molded at 220° C., and a blend (Metamarble made by Teijin Co.) of methacrylic resin and polycarbonate resin was injection molded at 260° C.

The obtained results are shown in the following Table 6.

TABLE 6

| | | Halogenoid | | | | | | | | Not treated (Comparative example) |
|---|---|---|---|---|---|---|---|---|---|---|
| | Acrylic resin | DCTS (N,N-Dichloro-p-toluenesulfonamide) | | | | TCCA (Trichloroisocyanuric acid) | | | | |
| | | 2% | 5% | 10% | 20% | 2% | 5% | 10% | 20% | |
| ASTM D429, Method B | Methacrylic resin (Acrypet MD) | 8kg/25mm | 52kg/25mm | 48kg/25mm | 50kg/25mm | 45kg/25mm | 53kg/25mm | 41kg/25mm | 48kg/25mm | 0kg/25mm |
| | | (20R) | (100R) | (100R) | (100R) | (100R) | (100R) | (100R) | (100R) | (R/P) |
| | Metacrylic resin + polycarbonate (Metamarble) | 5kg/25mm | 12kg/25mm | 49kg/25mm | 42kg/25mm | 45kg/25mm | 40kg/25mm | 42kg/25mm | 42kg/25mm | 0kg/25mm |
| | | (10R) | (25R) | (100R) | (100R) | (100R) | (100R) | (100R) | (100R) | (R/P) |
| ASTM D429, Method C | Methacrylic resin (Acrypet MD) | 96kg | 128kg | 138kg | 140kg | 130kg | 124kg | 113kg | 108kg | 5kg |
| | | (20R) | (50R) | (100R) | (P) | (100R) | (100R) | (100R) | (100R) | (R/P) |
| | Metacrylic resin + polycarbonate (Metamarble) | 68kg | 108kg | 120kg | 132kg | 122kg | 128kg | 120kg | 119kg | 8kg |
| | | (30R) | (80R) | (100R) | (100R) | (80R) | (100R) | (100R) | (100R) | (R/P) |

What is claimed is:

1. A method of bonding vulcanized rubber to resin, comprising treating the surface of a vulcanized rubber with at least one member selected from the group consisting of halogen, halogen generating compound, and halogenoid to form a treated rubber surface region, and bonding a heated and melted resin selected from the group consisting of polyamide resin, polyester resin, styrene series resin and acrylic resin to the above treated rubber surface region by the injection or extrusion molding.

2. A method according to claim 1, wherein said halogen is at least one member selected from the group consisting of chlorine, bromine and iodine.

3. A method according to claim 1, wherein said halogen generating compound is hypochlorous acid.

4. A method according to claim 1, wherein said halogenoid is at least one member selected from the group consisting of N,N-dichloro-p-toluenesulfonamide and trichloroisocyanuric acid.

5. A method according to claim 1, wherein said resin is polyamide resin.

6. A method according to claim 5, wherein said polyamide resin consists mainly of polyamide resin having amide groups in the main chain.

7. A method according to claim 1, wherein said resin is polyester resin.

8. A method according to claim 7, wherein said polyester resin is thermoplastic resin consisting mainly of polyethylene terephthalate or polybutylene terephthalate.

9. A method according to claim 1, wherein said resin is styrene series resin.

10. A method according to claim 1, wherein said resin is acrylic resin.

* * * * *